(12) United States Patent
Tsukagoshi

(10) Patent No.: US 10,904,592 B2
(45) Date of Patent: Jan. 26, 2021

(54) TRANSMISSION APPARATUS, TRANSMISSION METHOD, IMAGE PROCESSING APPARATUS, IMAGE PROCESSING METHOD, RECEPTION APPARATUS, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/571,555

(22) PCT Filed: May 10, 2016

(86) PCT No.: PCT/JP2016/063922
§ 371 (c)(1),
(2) Date: Nov. 3, 2017

(87) PCT Pub. No.: WO2016/190089
PCT Pub. Date: Dec. 1, 2016

(65) Prior Publication Data
US 2018/0146219 A1    May 24, 2018

(30) Foreign Application Priority Data

May 22, 2015    (JP) .................................. 2015-104216

(51) Int. Cl.
*H04N 21/236*    (2011.01)
*H04N 21/854*    (2011.01)
(Continued)

(52) U.S. Cl.
CPC ......... *H04N 21/236* (2013.01); *H04N 13/398* (2018.05); *H04N 21/23614* (2013.01);
(Continued)

(58) Field of Classification Search
None
See application file for complete search history.

(56) References Cited

U.S. PATENT DOCUMENTS

2007/0140499 A1*    6/2007    Davis .................. G10L 19/0204
381/23
2009/0059068 A1*    3/2009    Hanaoka .................. G09G 3/20
348/459

(Continued)

FOREIGN PATENT DOCUMENTS

JP    2013-030907    2/2013
JP    2013-30907 A    2/2013
(Continued)

OTHER PUBLICATIONS

Schierl et al., "Scalable Video Coding over RTP and MPEG-2 Transport Stream in Broadcast and IPTV Channels," IEEE Wireless Communications, Oct. 2009, pp. 64-71. (Year: 2009).*

(Continued)

*Primary Examiner* — Christopher Braniff
(74) *Attorney, Agent, or Firm* — Oblon, McClelland, Maier & Neustadt, L.L.P.

(57) ABSTRACT

This is provided to achieve capability of avoiding hindrance of accurate reflection of intention at the time of production due to execution of frame interpolation on the reception side. A predetermined container including a video stream obtained by performing encoding operation on moving image data of a predetermined frame rate is transmitted. Information for restricting frame interpolation is inserted into one or both of a layer of the container and a layer of the video stream. For example, the information for restricting frame interpolation includes information for prohibiting frame interpolation. Moreover, for example, the information for restricting frame interpolation includes information indicating the number of times of frame repeats.

13 Claims, 13 Drawing Sheets

(51) Int. Cl.
  *H04N 21/6336* (2011.01)
  *H04N 21/4402* (2011.01)
  *H04N 21/434* (2011.01)
  *H04N 13/398* (2018.01)
  *H04N 7/01* (2006.01)
  *H04N 21/234* (2011.01)

(52) U.S. Cl.
  CPC ....... *H04N 21/434* (2013.01); *H04N 21/4402* (2013.01); *H04N 21/440281* (2013.01); *H04N 21/6336* (2013.01); *H04N 21/85406* (2013.01); *H04N 7/0127* (2013.01); *H04N 21/234* (2013.01)

(56) References Cited

U.S. PATENT DOCUMENTS

| | | | |
|---|---|---|---|
| 2014/0168366 A1 | 6/2014 | Ichiki et al. | |
| 2014/0362923 A1* | 12/2014 | Nio | H04N 7/014 |
| | | | 375/240.16 |
| 2016/0212434 A1 | 7/2016 | Tsukagoshi | |
| 2018/0035112 A1* | 2/2018 | Kim | H04N 19/176 |

FOREIGN PATENT DOCUMENTS

| | | |
|---|---|---|
| JP | 2013-143646 A | 7/2013 |
| WO | 2013/057938 A1 | 4/2013 |
| WO | WO2013/057938 | 4/2013 |
| WO | 2013/088589 A1 | 6/2013 |
| WO | WO2013/088589 | 6/2013 |
| WO | 2015/053157 A1 | 4/2015 |
| WO | WO2015/053157 | 4/2015 |

OTHER PUBLICATIONS

International Search Report dated Aug. 16, 2016 in PCT/JP2016/063922 filed May 10, 2016.
Combined Chinese Office Action and Search Report dated Nov. 19, 2019 in Chinese Patent Application No. 201680027991.X (with English translation), 26 pages.
Japanese Office Action Issued in Application 2017-520604 dated Jun. 16, 2020 (4 pages).

* cited by examiner

FIG. 5 frame_interpolation_restriction SEI (a)

| Syntax | format |
|---|---|
| frame_interpolation_restriction SEI (){ | |
|   frame_interpolation_restriction_id | ue(v) |
|   frame_interpolation_prohibited_flag | 1 |
|   frame_repeat_type | ue(v) |
| } | | semantics frame_interpolation_prohibited_flag (1bit)
  1    FRAME INTERPOLATION PROHIBITED
  0    FRAME INTERPOLATION NON-PROHIBITED frame_repeat_type    INDICATING FRAME REPEAT TYPE
  000    Unlimited frame repeat (NUMBER OF TIMES OF REPEATS IS NOT SPECIFIED. IT IS ASSUMED THAT DETERMINATION IS PERFORMED ON RECEPTION DISPLAY SIDE, SO AS TO MATCH DISPLAY FRAME RATE)
  001    ONE FRAME REPEAT
  010    TWO FRAME REPEATS
  011    THREE FRAME REPEATS
  100    FOUR FRAME REPEATS
  101    FIVE FRAME REPEATS (b)

FIG. 6 frame_interpolation_restriction descriptor syntax

| Syntax | No. of Bits | Format |
|---|---|---|
| frame_interpolation_restriction_descriptor ( ) { | | |
|     descriptor_tag | 8 | uimsbf |
|     descriptor length | 8 | uimsbf |
|     frame_interpolation_prohibited_flag | 1 | uimsbf |
|     frame_rate | 3 | uimsbf |
|     frame_repeat_type | 3 | uimsbf |
| } | | |

FIG. 7 semantics

```
frame_interpolation_prohibited_flag (1bit)
        1         FRAME INTERPOLATION PROHIBITED
        0         FRAME INTERPOLATION NON-PROHIBITED Frame rate (3bits)    INDICATING FRAME RATE
        001       24Hz
        010       30Hz
        011       60Hz
        100       120Hz frame_repeat_type     INDICATING FRAME REPEAT TYPE
        000       Unlimited frame repeat (NUMBER OF TIMES OF REPEATS IS NOT SPECIFIED.
                                          IT IS ASSUMED THAT DETERMINATION IS PERFORMED
                                          ON RECEPTION DISPLAY SIDE, SO AS TO MATCH
                                          DISPLAY FRAME RATE)
        001       ONE FRAME REPEAT
        010       TWO FRAME REPEATS
        011       THREE FRAME REPEATS
        100       FOUR FRAME REPEATS
        101       FIVE FRAME REPEATS
```

FIG. 10

| | Descriptor |
|---|---|
| pic_timing( payloadSize ) { | |
|   if( frame_field_info_present_flag ) { | |
|     pic_struct | u(4) |
|     source_scan_type | u(2) |
|     duplicate_flag | u(1) |
|   } | |
|   if( CpbDpbDelaysPresentFlag ) { | |
|     au_cpb_removal_delay_minus1 | u(v) |
|     pic_dpb_output_delay | u(v) |
|     if( sub_pic_hrd_params_present_flag ) | |
|       pic_dpb_output_du_delay | u(v) |
|     if( sub_pic_hrd_params_present_flag && | |
|       sub_pic_cpb_params_in_pic_timing_sei_flag ) { | |
|       num_decoding_units_minus1 | ue(v) |
|       du_common_cpb_removal_delay_flag | u(1) |
|       if( du_common_cpb_removal_delay_flag ) | |
|         du_common_cpb_removal_delay_increment_minus1 | u(v) |
|       for( i = 0; i <= num_decoding_units_minus1; i++ ) { | |
|         num_nalus_in_du_minus1[ i ] | ue(v) |
|         if( !du_common_cpb_removal_delay_flag && i | |
|           < num_decoding_units_minus1 ) | |
|           du_cpb_removal_delay_increment_minus1[ i ] | u(v) |
|       } | |
|     } | |
|   } | |
| } | |

*FIG. 11*

Interpretation of pic_struct

| Value | Indicated display of picture | Restriction |
|---|---|---|
| 0 | (progressive)frame | field_seq_flag shall be 0 |
| 1 | top field | field_seq_flag shall be 1 |
| 2 | bottom field | field_seq_flag shall be 1 |
| 3 | top field, bottom field, in that order | field_seq_flag shall be 0 |
| 4 | bottom field, top field, in that order | field_seq_flag shall be 0 |
| 5 | top field, bottom field, top field repeated, in that order | field_seq_flag shall be 0 |
| 6 | bottom field, top field, bottom field repeated, in that order | field_seq_flag shall be 0 |
| 7 | frame doubling | field_seq_flag shall be 0<br>fixed_pic_rate_within_cvs_flag shall be 1 |
| 8 | frame tripling | field_seq_flag shall be 0<br>fixed_pic_rate_within_cvs_flag shall be 1 |
| 9 | top field paired with previous bottom field in output order | field_seq_flag shall be 1 |
| 10 | bottom field paired with previous top field in output order | field_seq_flag shall be 1 |
| 11 | top field paired with next bottom field in output order | field_seq_flag shall be 1 |
| 12 | bottom field paired with next top field in output order | field_seq_flag shall be 1 |

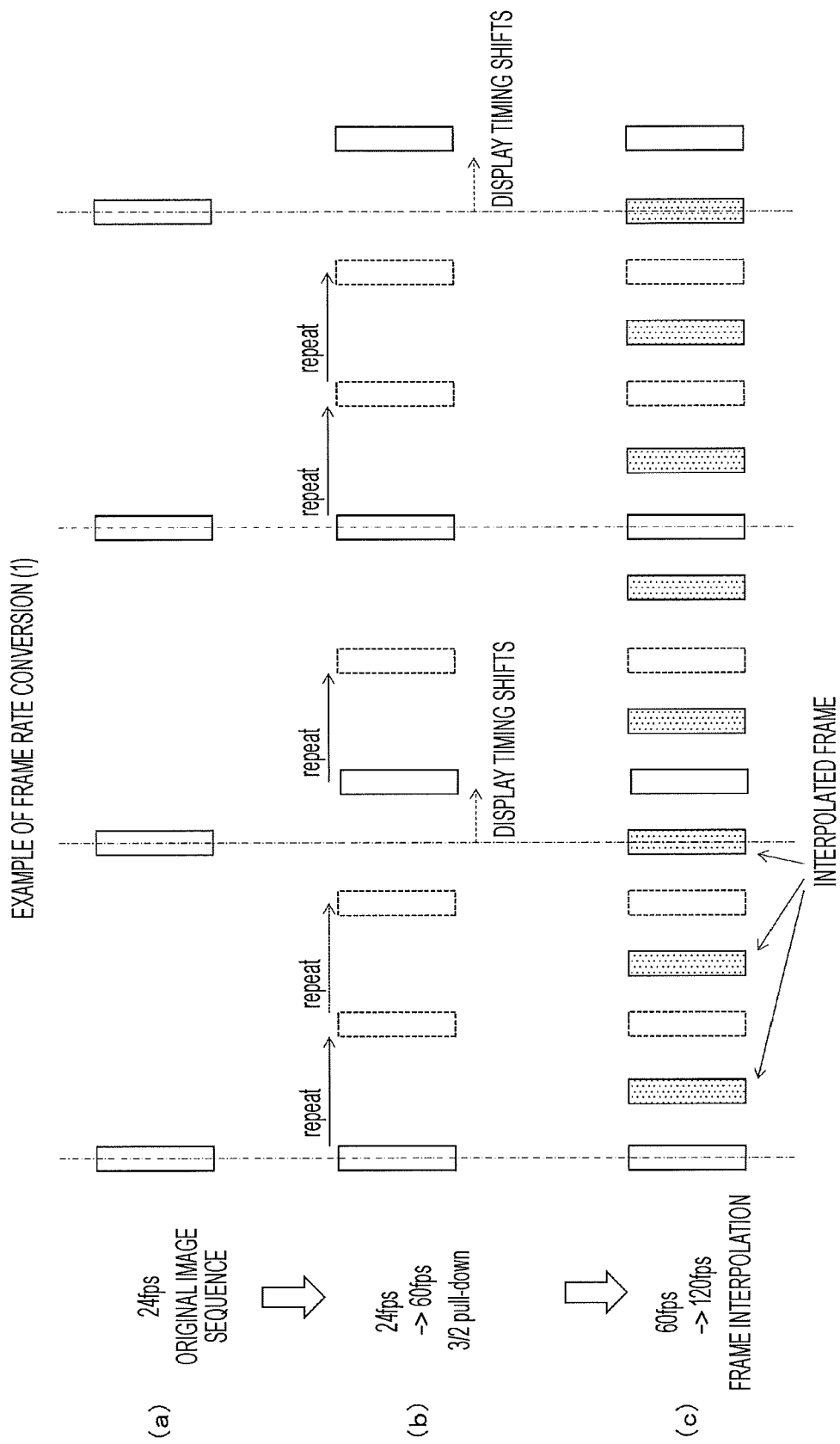

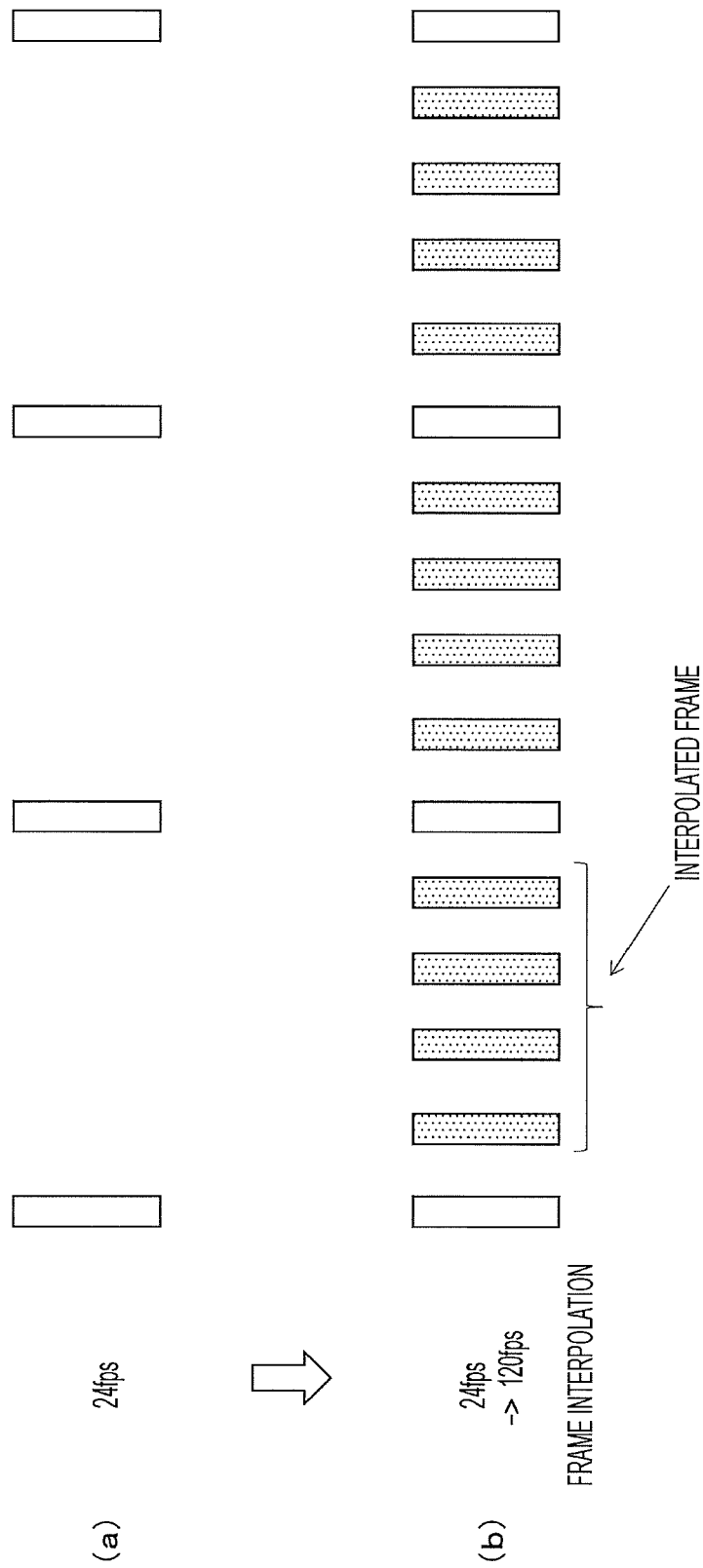

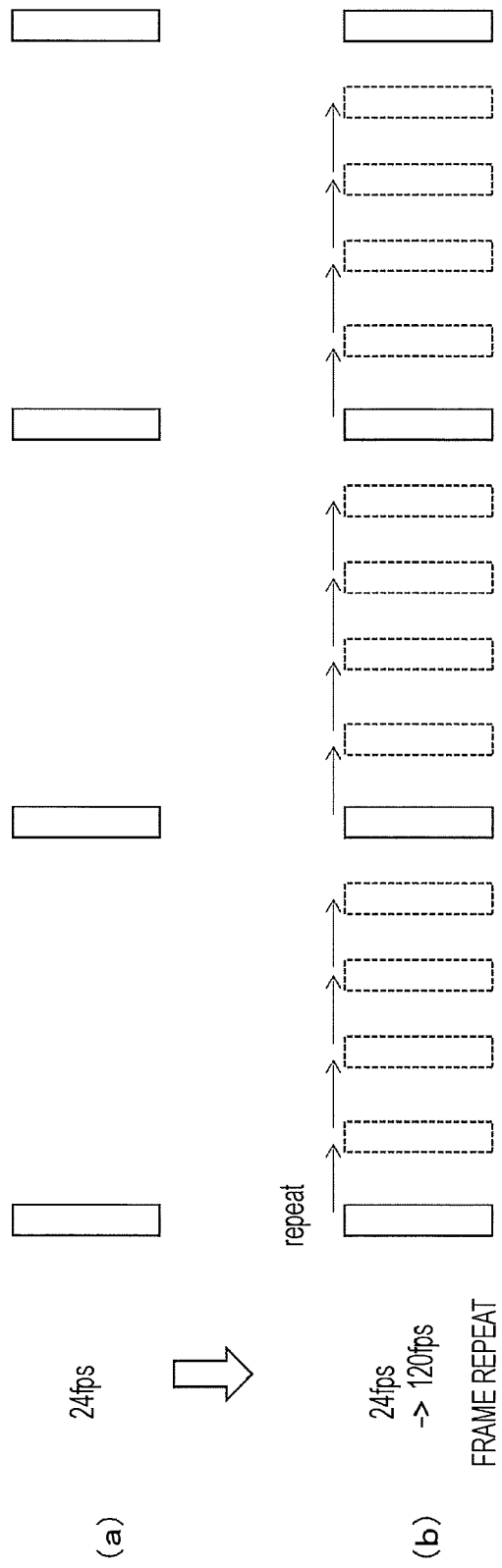

NEW DISPLAY SEQUENCE DEFINITION AT pic-stdruct of Picture_timing_SEI

| value | Indicated display of picture | Repeat number |
|---|---|---|
| 13 | frame quadrupling | 3 times repeat |
| 14 | frame quintupling | 4 times repeat |
| 15 | Unrestricted number of repeating | RECEIVER DETERMINES NUMBER OF TIMES OF REPEATS SO AS TO MATCH Display frame rate |

Video displaying InfoFrame

| Packet Byte # | 7 | 6 | 5 | 4 | 3 | 2 | 1 | 0 |
|---|---|---|---|---|---|---|---|---|
| InfoFrame Type Code | | | InfoFrame Type Code (0x08 ~ 0x1F) | | | | | |
| InfoFrame version number | | | Version number = 0x01 | | | | | |
| Length of InfoFrame | | | Length of Video displaying Infoframe | | | | | |
| Data Byte 1 | frame_ interpolation prohibited_flag | frame_repeat_type | | | Rsvd (0) | Rsvd (0) | Rsvd (0) | Rsvd (0) |

(b)

```
frame_interpolation_prohibited_flag (1bit)
    1       FRAME INTERPOLATION PROHIBITED
    0       FRAME INTERPOLATION NON-PROHIBITED
frame_repeat_type
    INDICATING FRAME REPEAT TYPE
    000     Unlimited frame repeat (NUMBER OF TIMES OF REPEATS IS NOT SPECIFIED.
            IT IS ASSUMED THAT DETERMINATION IS PERFORMED ON RECEPTION DISPLAY
            SIDE, SO AS TO MATCH DISPLAY FRAME RATE)
    001     ONE FRAME REPEAT
    010     TWO FRAME REPEATS
    011     THREE FRAME REPEATS
    100     FOUR FRAME REPEATS
    101     FIVE FRAME REPEATS
```

TRANSMISSION APPARATUS, TRANSMISSION METHOD, IMAGE PROCESSING APPARATUS, IMAGE PROCESSING METHOD, RECEPTION APPARATUS, AND RECEPTION METHOD

TECHNICAL FIELD

The present technology relates to a transmission apparatus, a transmission method, an image processing apparatus, an image processing method, a reception apparatus, and a reception method. More specifically, the present technology relates to a transmission apparatus, or the like, that transmits moving image data of a predetermined frame rate.

BACKGROUND ART

Conventionally, in order to enhance image quality of a display apparatus, there is a known technique, on a reception side, of performing display after converting the frame rate into a higher rate (refer to, for example, Patent Document 1). In order to increase the frame rate, it is necessary to perform processing of increasing the number of frames. Processing for this purpose includes frame repeat of repeating a same frame and frame interpolation of creating a new frame using preceding and succeeding frames.

CITATION LIST

Patent Document

Patent Document 1: JP 2013-143646 A

SUMMARY OF THE INVENTION

Problems to be Solved by the Invention

Depending on the type of content, frame interpolation performed on the reception side with respect to the moving image data to be delivered might hinder accurate reflection of the intention at the time of production.

An object of the present technology is to provide a technique capable of avoiding hindrance of accurate reflection of the intention at the time of production due to execution of frame interpolation on the reception side.

Solutions to Problems

A concept of the present technology is a transmission apparatus including: a transmission unit configured to transmit a predetermined container including a video stream obtained by performing encoding operation on moving image data of a predetermined frame rate; and an information insertion unit configured to insert information for restricting frame interpolation into one or both of a layer of the container and a layer of the video stream.

In the present technology, a predetermined container including a video stream obtained by performing encoding operation on the moving image data of a predetermined frame rate is transmitted by the transmission unit. Information for restricting frame interpolation is inserted into one or both of the layer of the container and the layer of the video stream by the information insertion unit.

For example, information for restricting frame interpolation may include information for prohibiting frame interpolation. Moreover, for example, the information for restricting the frame interpolation may include information indicating the number of times of frame repeats. Moreover, for example, the information insertion unit may insert a descriptor including the information for restricting frame interpolation into the layer of the container. Moreover, for example, the information insertion unit may insert an SEI message including information for restricting frame interpolation into the layer of the video stream.

In this manner, in the present technology, information for restricting frame interpolation is inserted into one or both of the layer of the container and the layer of the video stream. With this configuration, it is possible to restrict, on the reception side, frame interpolation onto the transmitted moving image data on the basis of the information, and it is possible to avoid hindrance of accurate reflection of the intention at the time of production.

Moreover, another concept of the present technology is an image processing apparatus including: an image data acquisition unit configured to obtain moving image data of a predetermined frame rate; and a control unit configured to control frame rate conversion processing of converting the frame rate of the moving image data into a display frame rate and performing output at the display frame rate on the basis of information for restricting frame interpolation.

In the present technology, moving image data of a predetermined frame rate is obtained by the data acquisition unit. The control unit controls frame rate conversion processing of converting the frame rate of the moving image data into the display frame rate and performing output at the display frame rate on the basis of information for restricting frame interpolation.

For example, it is allowable to configure such that the image data acquisition unit receives a container of a predetermined format including a video stream obtained by performing encoding operation on moving image data of a predetermined frame rate, and that moving image data of a predetermined frame rate is obtained by performing decoding operation on the video stream. In this case, for example, the information for restricting frame interpolation may be inserted in one or both of the layer of the container and the layer of the video stream.

Moreover, for example, the image data acquisition unit may obtain moving image data of a predetermined frame from an external device via a digital interface. In this case, for example, the information for restricting the frame interpolation may be obtained from the external device via the digital interface.

As described above, the present technology controls the frame rate conversion processing of converting the frame rate of moving image data into the display frame rate and performing output at the display frame rate on the basis of information for restricting frame interpolation. With this configuration, it is possible to avoid hindrance of accurate reflection of the intention at the time of production due to execution of frame interpolation.

Moreover, another concept of the present technology is a reception apparatus including a reception unit configured to receive a container of a predetermined format including a video stream obtained by performing encoding operation on moving image data of a predetermined frame rate, information for restricting frame interpolation being inserted into one or both of a layer of the container and a layer of the video stream, the reception apparatus further including a control unit configured to control decode processing of obtaining moving image data of a predetermine frame rate by performing decoding operation on the video stream and configured to control frame rate conversion processing of converting the frame rate of the moving image data obtained by the decode processing into a display frame rate and performing output at the display frame rate on the basis of the information for controlling frame interpolation.

In the present technology, the reception unit receives a container of a predetermined format including a video stream obtained by performing encoding operation on the moving image data of a predetermined frame rate. Information for restricting frame interpolation is inserted into one or both of the layer of the container and the layer of the video stream.

The control unit controls decode processing of obtaining moving image data of a predetermined frame rate by performing decoding operation on the video stream, and controls frame rate conversion processing of converting the frame rate of the moving image data obtained by decode processing into the display frame rate and performing output at the display frame rate on the basis of information for controlling frame interpolation.

In this manner, the present technology controls the frame rate conversion processing of converting the frame rate of moving image data obtained by performing decoding operation on the video stream into the display frame rate and performing output at the display frame rate on the basis of the information for restricting frame interpolation. With this configuration, it is possible to avoid hindrance of accurate reflection of the intention at the time of production due to execution of frame interpolation.

Moreover, another concept of the present technology is a reception apparatus including: a reception unit configured to receive moving image data of a predetermined frame rate and information for restricting frame interpolation from an external device via a digital interface; and a control unit configured to control frame rate conversion processing of converting the frame rate of the moving image data into a display frame rate and performing output at the display frame rate on the basis of the information for restricting frame interpolation.

In the present technology, the reception unit receives moving image data of a predetermined frame rate and information for restricting frame interpolation from the external device via the digital interface. For example, the digital interface may be configured as a high-definition multimedia interface (HDMI).

The control unit controls frame rate conversion processing of converting the frame rate of the moving image data into the display frame rate and performing output at the display frame rate on the basis of information for restricting frame interpolation.

As described above, the present technology controls the frame rate conversion processing of converting the frame rate of moving image data into the display frame rate and performing output at the display frame rate on the basis of information for restricting frame interpolation. With this configuration, it is possible to avoid hindrance of accurate reflection of the intention at the time of production due to execution of frame interpolation.

Moreover, another concept of the present technology is a reception apparatus including a reception unit configured to receive a container of a predetermined format including a video stream obtained by performing encoding operation on moving image data of a predetermined frame rate, information for restricting frame interpolation being inserted into one or both of a layer of the container and a layer of the video stream, the reception apparatus further including a control unit configured to control decode processing of obtaining moving image data of a predetermine frame rate by performing decoding operation on the video stream and configured to control transmission processing of transmitting the moving image data of a predetermined frame rate obtained in the decode processing and the information for restricting the frame interpolation to an external device via a digital interface.

In the present technology, the reception unit receives a container of a predetermined format including a video stream obtained by performing encoding operation on the moving image data of a predetermined frame rate. Information for restricting frame interpolation is inserted into one or both of the layer of the container and the layer of the video stream.

The control unit controls decode processing of obtaining moving image data of a predetermined frame rate by performing decoding operation on the video stream, and controls transmission processing of transmitting the moving image data of a predetermined frame rate obtained in the decode processing and information for restricting the frame interpolation to an external device via a digital interface.

As described above, the present technology transmits information for restricting frame interpolation related to the moving image data to the external device via the digital interface together with the moving image data of a predetermined frame rate. With this configuration, it is possible, on the reception side, to restrict frame interpolation onto the moving image data on the basis of the information for restricting frame interpolation related to the moving image data, and to avoid hindrance of accurate reflection of the intention at the time of production.

Effects of the Invention

According to the present technology, it is possible to avoid hindrance of accurate reflection of the intention at the time of production due to execution of frame interpolation on the reception side. Note that effects described herein are non-restricting. The effects may be any effects described in the present disclosure.

BRIEF DESCRIPTION OF DRAWINGS

FIG. 5 is a diagram illustrating an exemplary structure of a frame interpolation restriction SEI message and content of main information in the exemplary structure.

FIG. 6 is a diagram illustrating an exemplary structure of a frame interpolation restriction descriptor.

FIG. 7 is a diagram illustrating content of main information in an exemplary structure of a frame interpolation restriction descriptor.

FIG. 10 is a diagram illustrating an exemplary structure of a picture timing SEI message.

FIG. 11 is a diagram illustrating a display sequence of "pic_struct" of the picture timing SEI message currently defined.

FIG. 12 is a diagram illustrating a frame rate conversion example (1) in a case where frame interpolation is not restricted.

FIG. 13 is a diagram illustrating a frame rate conversion example (2) in a case where frame interpolation is not restricted.

FIG. 14 is a diagram illustrating an example of frame rate conversion in a case where frame interpolation is restricted on the basis of information for restricting frame interpolation.

FIG. 17 is a diagram illustrating an exemplary structure of a packet of "Video displaying InfoFrame" and the content of main information in the exemplary structural

MODE FOR CARRYING OUT THE INVENTION

Hereinafter, embodiments of the present invention (hereinafter, embodiment(s)) will be described. Note that description will be presented in the following order.
1. Embodiment
2. Modification example

1. EMBODIMENT

[Transmission-Reception System]

Figure 1:
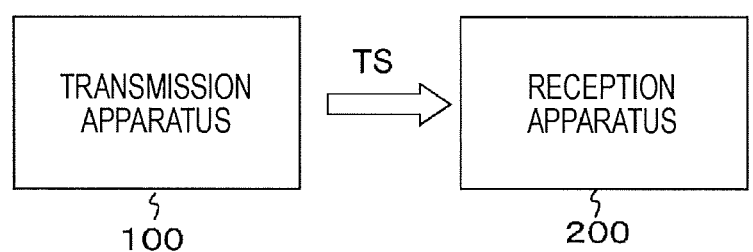
FIG. 1 is a block diagram illustrating an exemplary configuration of a transmission-reception system according to an embodiment.

FIG. 1 illustrates an exemplary configuration of a transmission-reception system 10 according to an embodiment. The transmission-reception system 10 includes a transmission apparatus 100 and a reception apparatus 200.

The transmission apparatus 100 transmits a transport stream TS as a container over broadcast waves. The transport stream TS includes a video stream obtained by performing encoding operation on moving image data of a predetermined frame rate such as 24 Hz, 30 Hz, 60 Hz, or 120 Hz. In this case, for example, encoding such as H.264/AVC, H.265/HEVC, or the like, is performed.

Information for restricting frame interpolation is inserted into one or both of the layer of the transport stream TS as a container and the layer of the video stream. On the reception side, information for restricting frame interpolation can be easily obtained from the layer of the transport stream TS and the layer of the video stream.

In the present embodiment, the transmission apparatus 100 inserts a descriptor including information for restricting frame interpolation into a layer of the transport stream TS. Moreover, in the present embodiment, the transmission apparatus 100 inserts an SEI message including information for restricting frame interpolation into a layer of a video stream.

The reception apparatus 200 receives a transport stream TS transmitted from the transmission apparatus 100 over the broadcast waves. The transport stream TS includes a video stream obtained by performing encoding operation on moving image data of a predetermined frame rate. Information for restricting frame interpolation is inserted in one or both of the layer of the transport stream TS and the layer of the video stream.

The reception apparatus 200 obtains moving image data for display by performing decode processing of obtaining moving image data of a predetermined frame rate by performing decoding operation on the video stream and by performing frame rate conversion processing of converting the frame rate of the moving image data into the display frame rate. In the presence of information for restricting frame interpolation, the reception apparatus 200 prohibits execution of frame interpolation by controlling the frame rate conversion processing on the basis of the information.

"Configuration of Transmission Apparatus"

Figure 2:
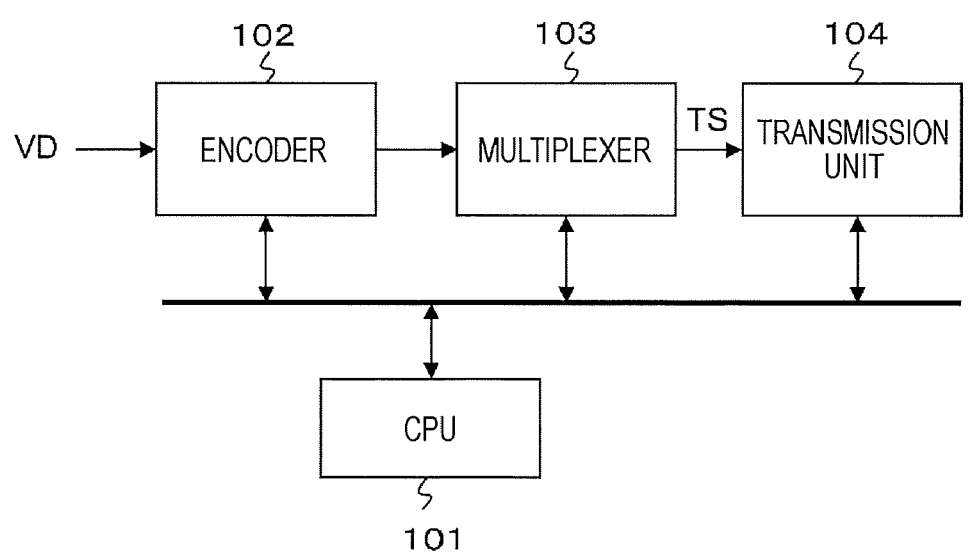
FIG. 2 is a block diagram illustrating an exemplary configuration of a transmission apparatus.

FIG. 2 illustrates an exemplary configuration of the transmission apparatus 100. The transmission apparatus 100 includes a central processing unit (CPU) 101, an encoder 102, a multiplexer 103, and a transmission unit 104. The CPU 101 is a control unit, and controls operation of each of portions of the transmission apparatus 100.

Moving image data VD of a predetermined frame rate constituting the image sequence for distribution is input in the encoder 102. The encoder 102 generates a video stream by performing encoding operation such as H.264/AVC or H.265/HEVC, on the moving image data VD, for example.

At this time, the encoder 102 inserts information for restricting frame interpolation into the layer of the video stream. That is, the encoder 102 inserts a newly de fined frame interpolation restriction SEI message (frame_interpolation_restriction SEI message) into a "SEIs" portion of the access unit (AU).

Figure 3:
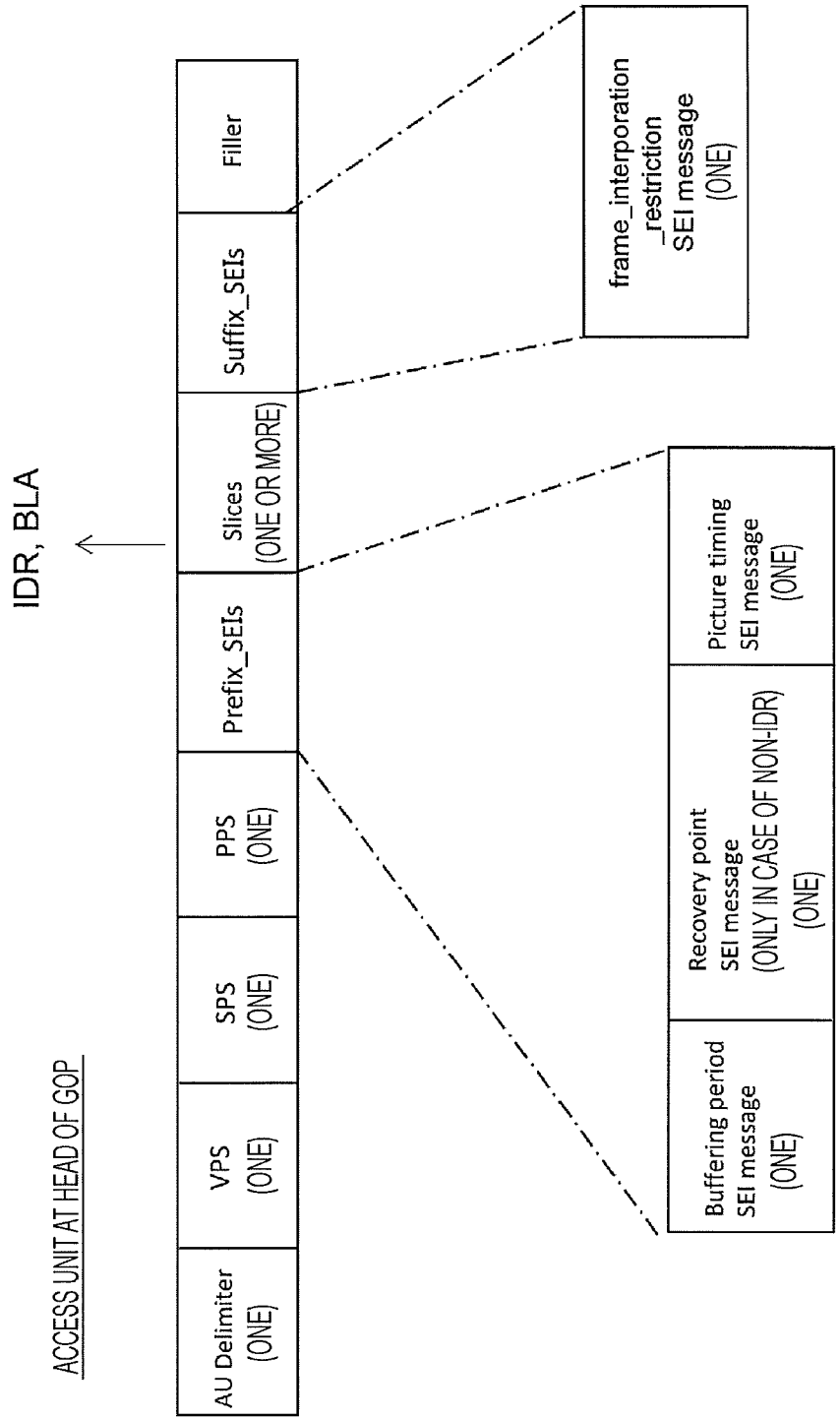
FIG. 3 is a diagram illustrating an access unit at a head of a GOP in a case where the encoding system is HEVC.
Figure 4:
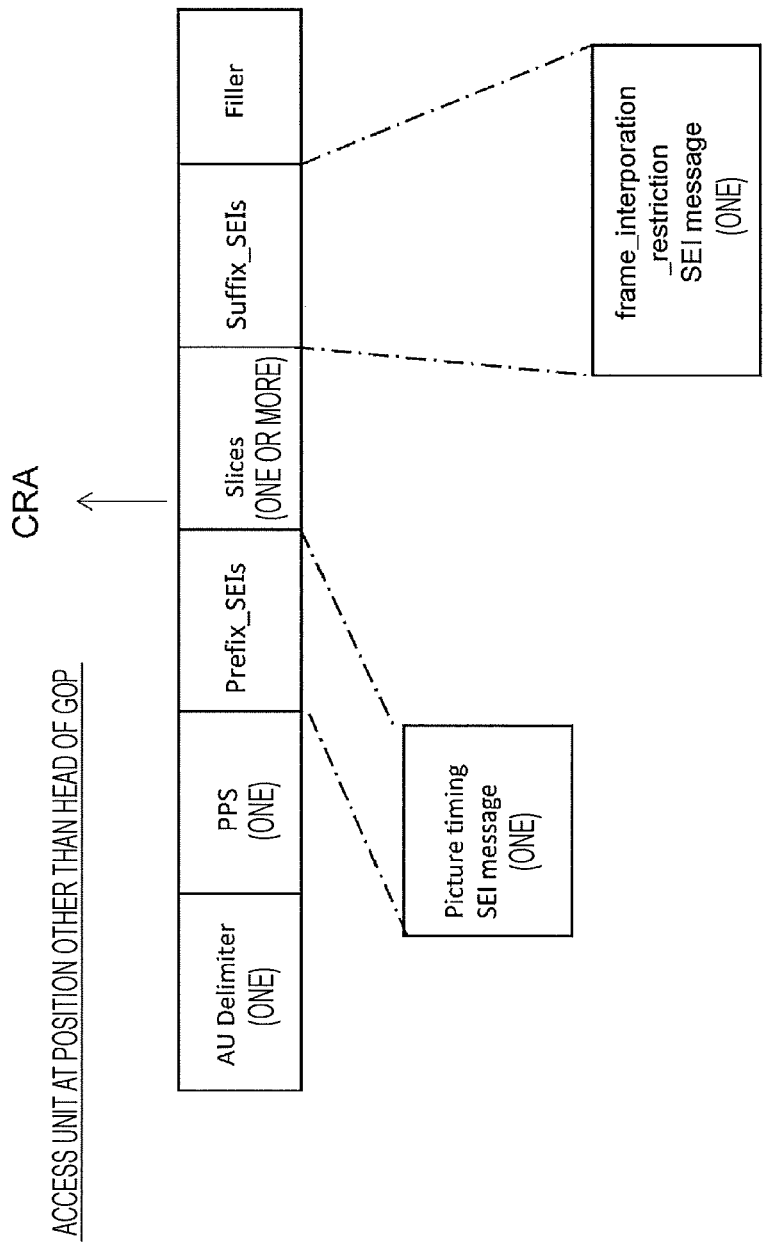
FIG. 4 is a diagram illustrating an access unit other than the head of the GOP in a case where the encoding system is HEVC.

FIG. 3 illustrates an access unit at the head of group of pictures (GOP) in a case where the encoding system is HEVC. Moreover, FIG. 4 illustrates an access unit other than the head of the GOP in a case where the encoding system is HEVC. In the case of the HEVC encoding system, a set of SEI messages "Prefix_SEI s" for decoding is arranged before slices in which pixel data is encoded, and a set of SEI messages for display "Suffix_SEIs" is arranged after this slice. As illustrated in FIGS. 3 and 4, the frame interpolation restriction SEI message is arranged as the SEI message group "Suffix_SEIs", for example.

FIG. 5(a) illustrates an exemplary structure (Syntax) of frame interpolation restriction SEI message. FIG. 5(b) illustrates content (Semantics) of main information in the exemplary structure. The 1-bit field of "frame_interpolation_prohibited_flag" represents flag information indicating whether frame interpolation is prohibited. For example, "1" indicates that frame interpolation is prohibited, and "0" indicates that frame interpolation is not prohibited.

The "frame_repeat_type" field indicates the type of frame repeat. For example, "000" indicates unlimited frame repeat. This is based on the assumption that the number of times of repeats is not specified, and the reception display side determines the number of times of repeats so as to match the frame rate of the display. Moreover, "001" indicates one frame repeat, "010" indicates two frame repeats, "011" indicates three frame repeats, "100" indicates four frame repeats, and "101" indicates five frame repeats.

Returning to FIG. 2, the multiplexer 103 converts the video stream generated by the encoder 102 into a packetized elementary stream (PES) packet, further multiplexes it by converting it into a transport packet, and obtains a transport stream TS as a multiplexed stream.

At this time, information for restricting frame interpolation is inserted into the layer of the transport stream TS as a container. That is, the multiplexer 103 inserts a frame interpolation restriction descriptor (frame_interpolation_restriction descriptor) into a video elementary stream loop arranged corresponding to the video stream under the program map table.

FIG. 6 illustrates an exemplary structure (Syntax) of a frame interpolation restriction descriptor. FIG. 7(b) illustrates content (Semantics) of main information in the exemplary structure. The 8-bit field of "descriptor_tag" indicates the descriptor type. Herein, this indicates that it is a frame interpolation restriction descriptor. The 8-bit field of "descriptor_length" indicates the length (size) of the descriptor and indicates the subsequent byte length as the length of the descriptor. Herein, this indicates three bytes.

The 1-bit field of "frame_interpolation_prohibited_flag" represents flag information indicating whether frame interpolation is prohibited. For example, "1" indicates that frame interpolation is prohibited, and "0" indicates that frame interpolation is not prohibited.

The 3-bit field of "frame_rate" indicates the frame rate. For example, "001" indicates 24 Hz, "010" indicates 30 Hz, "011" indicates 60 Hz, and "100" indicates 120 Hz.

The "frame_repeat_type" field indicates the type of frame repeat. For example, "000" indicates unlimited frame repeat. This is based on the assumption that the number of times of repeats is not specified, and the reception display side determines the number of times of repeats so as to match the frame rate of the display. Moreover, "001" indicates one frame repeat, "010" indicates two frame repeats, "011" indicates three frame repeats, "100" indicates four frame repeats, and "101" indicates five frame repeats.

Returning to FIG. 2, the transmission unit 104 transmits the transport stream TS obtained by the multiplexer 103 over the broadcast waves and to the reception apparatus 200.

Figure 8:
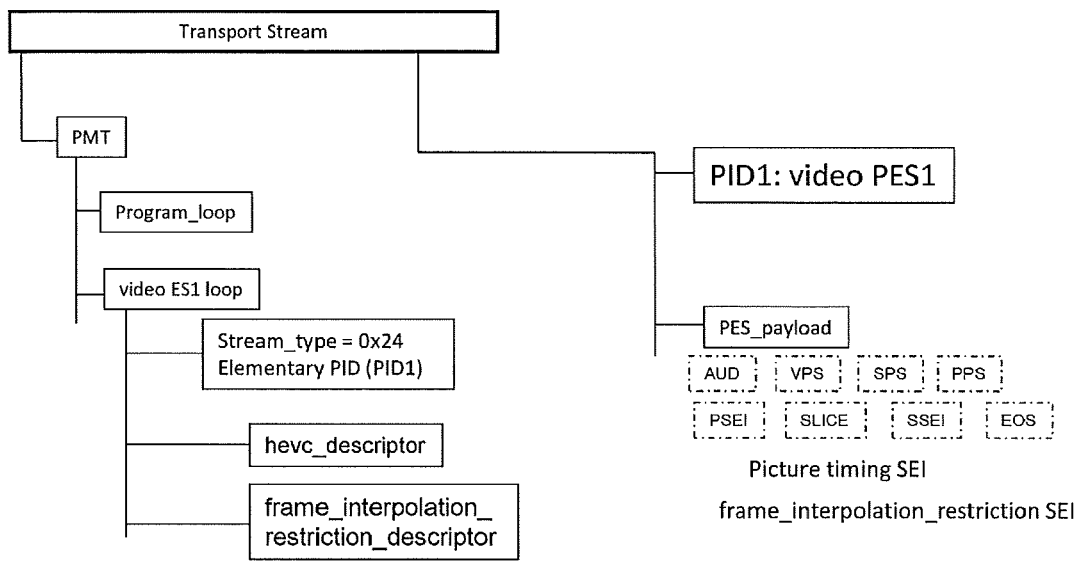
FIG. 8 is a diagram illustrating an exemplary configuration of a transport stream TS.

FIG. 8 illustrates an exemplary configuration of the transport stream TS. In the exemplary configuration, there exists a PES packet "video PES 1" of the video stream. The encoded image data of each of pictures included in the PES payload is configured by NAL units such as "AUD", "VPS", "SPS", "PPS", "PSEI", "SLICE", "SSEI", "EOS". The above-described frame interpolation restriction SEI message (refer to FIG. 5 (a)) is inserted as an SEI message.

Moreover, the transport stream TS includes a program map table (PMT) as program specific information (PSI). The PSI is information describing each of elementary streams included in the transport stream belongs to which program. In the PMT, there is a program loop that describes information related to an entire program. Moreover, an elementary stream loop having information related to each of the elementary streams also exists in the PMT. In the exemplary configuration, there exists a video elementary stream loop (video ES1 loop).

In the video elementary stream loop, information such as a stream type, a packet identifier (PID) is arranged corresponding to the video stream (video PES 1), and a descriptor describing information related to the video stream is also arranged. As one of the descriptors, an HEVC descriptor (HEVC_descriptor) or the above-described frame interpolation restriction descriptor (refer to FIG. 6) is inserted.

Operation of the transmission apparatus 100 illustrated in FIG. 2 will be briefly described. Moving image data VD of a predetermined frame rate constituting the image sequence for distribution is input into the encoder 102. The encoder 102 generates a video stream by applying encoding operation such as H.264/AVC or H.265/HEVC, for example, on the moving image data VD.

Moreover, in the encoder 102, information for restricting frame interpolation is inserted into the layer of the video stream. That is, in the encoder 102, newly defined frame interpolation restriction SEI message (refer to FIG. 5(a)) is inserted in the "SEIs" portion of the access unit (AU).

The video stream generated by the encoder 102 is supplied to the multiplexer 103. In the multiplexer 103, multiplexing is performed by PES packetization of the video stream and transport packetization and a transport stream TS as a multiplexed stream is obtained.

Moreover, in the multiplexer 103, information for restricting frame interpolation is inserted into the layer of the transport stream TS as a container. That is, a frame interpolation restriction descriptor (refer to FIG. 6) is inserted into the video elementary stream loop arranged corresponding to the video stream under the program map table.

The transport stream TS generated by the multiplexer 103 is transmitted to the transmission unit 104. In the transmission unit 104, the transport stream TS is modulated by a modulation scheme suitable for broadcasting such as QPSK/OFDM, for example, and the RF modulation signal is transmitted from the transmission antenna.

"Configuration of Reception Apparatus"

Figure 9:
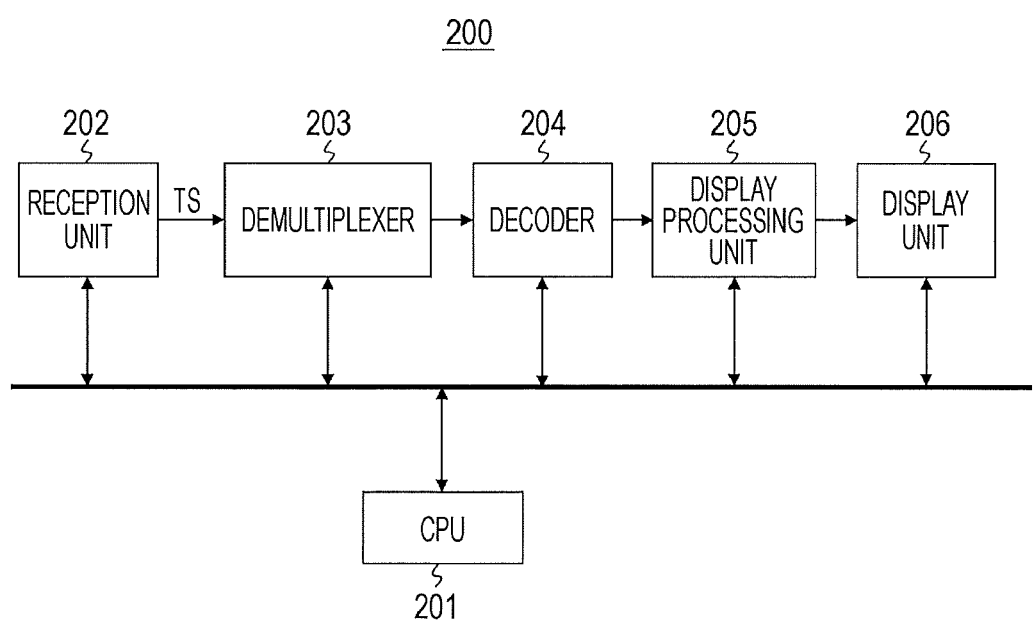
FIG. 9 is a block diagram illustrating an exemplary configuration of a reception apparatus.

FIG. 9 illustrates an exemplary configuration of the reception apparatus 200. The reception apparatus 200 includes a central processing unit (CPU) 201, a reception unit 202, a demultiplexer 203, a decoder 204, a display processing unit 205, and a display unit 206. The CPU 201 constitutes a control unit and controls operation of each of units of the reception apparatus 200.

The reception unit 202 receives the transport stream TS transmitted from the transmission apparatus 100 over broadcast waves or packets on a network. The transport stream TS includes a video stream obtained by performing encoding operation on moving image data of a predetermined frame rate.

The demultiplexer 203 extracts a video stream from the transport stream TS by PID filtering and supplies the extracted video stream to the decoder 204. Moreover, the demultiplexer 203 extracts section information included in the layer of the transport stream TS, and transmits the extracted section information to the CPU 201. In this case, a frame interpolation restriction descriptor (refer to FIG. 6) including information for restricting frame interpolation is also extracted.

The decoder 204 performs decoding operation on the video stream supplied from the demultiplexer 203, and outputs moving image data of a predetermined frame rate. Moreover, the decoder 204 extracts parameter sets and SEI messages inserted in each of access units constituting the video stream, and transmits them to the CPU 201. In this case, frame interpolation restriction SEI message (refer to FIG. 5 (a)) including information for restricting frame interpolation is also extracted.

Note that the decoder 204 includes an output buffer (not illustrated), and also can perform frame repeat on the moving image data obtained by the decoding operation and perform output. The CPU 201 controls the frame repeat in the decoder 204 on the basis of, for example, information of a field of "pic_struct" of a picture timing SEI message (Picture_timing SEI message), information for restricting frame interpolation, or the like.

FIG. 10 illustrates an exemplary structure (Syntax) of a picture timing SEI message. FIG. 11 illustrates a display sequence of "pic_struct" currently defined.

The display processing unit 205 converts the frame rate of the moving image data obtained by the decoder 204 into a display frame rate and performs output at the display frame rate. Note that the frame rate of the moving image data obtained by the decoder 204 is set to be equal to or lower than the display frame rate. When the frame rate of the moving image data obtained by the decoder 204 is lower than the display frame rate, the display processing unit 205 performs frame rate conversion processing by frame interpolation or frame repeat. Note that when the frame rate of the moving image data obtained by the decoder 204 is equal to the display frame rate, the display processing unit 205 outputs the moving image data obtained by the decoder 204 as it is without performing the frame rate conversion processing.

The CPU 201 controls operation of the decoder 204 and the display processing unit 205 on the basis of the information for restricting frame interpolation included in the frame interpolation restriction descriptor or the frame interpolation restriction SEI message. Details of control will be detailed below.

The display unit 206 displays the moving image based on the moving image data obtained by the display processing unit 205. For example, the display unit 206 is formed with a liquid crystal display (LCD) and an organic electroluminescence (EL) panel, or the like. Note that the display unit 206 may be an external device connected to the reception apparatus 200.

Operation of the reception apparatus 200 illustrated in FIG. 9 will be briefly described. In the reception unit 202, the RF modulation signal received by the reception antenna is demodulated, and the transport stream TS is obtained. This transport stream TS is transmitted to the demultiplexer 203. In the demultiplexer 203, a video stream to undergo decoding operation by PID filtering is extracted from the transport streams TS.

Moreover, in the demultiplexer 203, section information included in the layer of the transport stream TS is extracted and transmitted to the CPU 201. In this case, a frame interpolation restriction descriptor (refer to FIG. 6) including information for restricting frame interpolation is also extracted. With this configuration, the CPU 201 obtains information for restricting frame interpolation from this descriptor.

The video stream extracted by the demultiplexer 203 is supplied to the decoder 204. In the decoder 204, decoding operation is performed on the video stream, leading to acquisition of moving image data of a predetermined frame rate. Moreover, in the decoder 204, a parameter set and an SEI message inserted in each of the access units constituting the video stream are extracted and transmitted to the CPU 201. In this case, frame interpolation restriction SEI message (refer to FIG. 5 (*a*)) including information for restricting frame interpolation is also extracted. With this configuration, the CPU 201 obtains information for restricting frame interpolation from this SEI message.

The moving image data of the predetermined frame rate obtained by the decoder 204 is supplied to the display processing unit 205. In the display processing unit 205, the frame rate of the moving image data obtained by the decoder 204 is converted into the display frame rate and output at the display frame rate. Note that in a case where the frame rate of the moving image data obtained by the decoder 204 is equal to the display frame rate, the moving image data obtained by the decoder 204 is output as it is without undergoing frame rate conversion processing.

The moving image data output from the display processing unit 205 is supplied to the display unit 206. A moving image based on the moving image data is displayed on the display unit 206.

"Control by Information for Restricting Frame Interpolation"

Operation of the decoder 204 and the display processing unit 205 is controlled by the CPU 201 on the basis of the information for restricting frame interpolation included in the frame interpolation restriction descriptor or the frame interpolation restriction SEI message.

(1) For example, there is a conceivable case where the information of "frame_repeat_type" indicates the restricted number of times of repeats such as "001" to "101", and the combination of information of "frame_repeat_type" and information of "frame_interpolation_prohibited_flag" is used.

Now, the following is a case where the frame rate of the moving image data (received moving image data) obtained by the decoding operation is 30 Hz, "frame_repeat_type" is "011" indicating three frame repeats, and where "frame_interpolation_prohibited_flag" is "1" indicating that the frame interpolation is prohibited.

In this case, operation of the decoder 204 is controlled on the basis of the information of "frame_repeat_type", reading is performed four times at a 4× speed from the output buffer of the decoder 204, leading to acquisition of moving image data of a frame rate of 120 Hz. Furthermore, in a case where the display frame rate is 120 Hz, the moving image data of the frame rate of 120 Hz output from the decoder 204 is output as it is from the display processing unit 205.

Moreover, in a case where the display frame rate is 240 Hz, the operation of the display processing unit 205 is controlled on the basis of the information of "frame_interpolation_prohibited_flag", leading to the repeat of each of the frames once by the display processing unit 205, thereby outputting a moving image with a frame rate of 240 Hz from the display processing unit 205.

At this time, the operation of the decoder 204 may be controlled on the basis of the information of "frame_repeat_type" and the information of "frame_interpolation_prohibited_flag", the reading may be performed eight times at 8× speed from the output buffer of the decoder 204, and moving image data of frame rate of 240 Hz may be obtained. In this case, the moving image data of the frame rate of 240 Hz is output as it is from the display processing unit 205.

While the above description is a case where the frame repeat is mainly performed by the decoder 204, all the frame repeats may be performed by the display processing unit 205.

(2) Moreover, there is a conceivable case, for example, where the information of "frame_repeat_type" indicates an unlimited number of repeats like "000" and solely the information of the "frame_repeat_type" field is used.

Now, the following is a case where the frame rate of moving image data (received moving image data) obtained by decoding operation is 30 Hz and "frame_repeat_type" is "000" indicating an unlimited number of times of repeats.

In this case, operation of the decoder 204 is controlled on the basis of the information of "frame_repeat_type". In a case where the display frame rate is 120 Hz, reading is performed four times at 4*x* speed from the output buffer of the decoder 204, leading to acquisition of moving image data of a frame rate of 120 Hz. Then, the moving image data is output as it is from the display processing unit 205.

Moreover, in a case where the display frame rate is 240 Hz, reading is performed eight times at 8× speed from the output buffer of the decoder 204, leading to acquisition of moving image data of a frame rate of 240 Hz. Then, the moving image data is output as it is from the display processing unit 205.

Note that while the above description is a case where the frame repeat is performed by the decoder 204, the frame repeats may be performed by the display processing unit 205.

(3) Moreover, there is a conceivable case where, for example, information of "frame_interpolation_prohibited_flag" alone is used.

Now, the following is a case where the frame rate of moving image data (received moving image data) obtained by the decoding operation is 30 Hz and where "frame_interpolation_prohibited_flag" is "1" indicating that the frame interpolation is prohibited.

In this case, operation of the decoder 204 is controlled on the basis of the information of "frame_repeat_type". In a case where the display frame rate is 120 Hz, reading is performed four times at 4x speed from the output buffer of the decoder 204, leading to acquisition of moving image data of a frame rate of 120 Hz. Then, the moving image data is output as it is from the display processing unit 205.

Moreover, in a case where the display frame rate is 240 Hz, reading is performed eight times at 8× speed from the output buffer of the decoder 204, leading to acquisition of moving image data of a frame rate of 240 Hz. Then, the moving image data is output as it is from the display processing unit 205.

Note that while the above description is a case where the frame repeat is performed by the decoder 204, the frame repeats may be performed by the display processing unit 205.

As described above, according to the transmission apparatus 100 in the transmission-reception system 10 illustrated in FIG. 1, information for restricting frame interpolation is inserted into the layer of the transport stream TS as a container and the layer of the video stream. With this configuration, it is possible to restrict, on the reception side, frame interpolation onto the transmitted moving image data on the basis of the information, and it is possible to avoid hindrance of accurate reflection of the intention at the time of production.

For example, FIG. 12 illustrates an example (1) of frame rate conversion in a case where frame interpolation is not restricted. The following s an exemplary case where the frame rate of the moving image data (received moving image data) obtained by decoding operation is 24 Hz and the display frame rate is 120 Hz. Note that the similar conditions apply to the examples illustrated in FIGS. 13 and 14 below.

FIG. 12(a) illustrates moving image data (received moving image data) of a frame rate of 24 Hz obtained by decoding operation. FIG. 12 (b) illustrates moving image data of a frame rate of 60 Hz obtained by performing 3/2 pull-down processing on the received moving image data by frame repeat by reading from the output buffer of the decoder. FIG. 12 (c) illustrates moving image data of a frame rate of 120 Hz obtained by performing frame interpolation by the display processing unit on the decoder-output moving image data.

In this example, a display timing shift from an original time grid of 24 Hz occurs when the frame rate is set to 60 Hz by the 3/2 pull-down processing. This results in generation of less smooth movement in the display different from the original movement. Moreover, in this example, in conversion to the frame rate to 120 H by frame interpolation, an interpolation frame that does not originally exist is inserted in a state where the display timing is shifted from the original 24 Hz time grid. Therefore, this exemplary case might hinder accurate reflection of the intention at the time of production.

Moreover, for example, FIG. 13 illustrates an example (2) of frame rate conversion in the case where frame interpolation is not restricted. FIG. 13(a) illustrates moving image data (received moving image data) of a frame rate of 24 Hz obtained by decoding operation. FIG. 13(b) illustrates moving image data of a frame rate of 120 Hz obtained by performing frame interpolation by the display processing unit on the decoder-output moving image data of a frame rate of 24 Hz.

In this example, while no shift is generated in the display timing from the original 24 Hz time grid, an interpolation frame that does not originally exist is inserted. Therefore, this exemplary case might hinder accurate reflection of the intention at the time of production.

FIG. 14 illustrates an example of frame rate conversion in the case where frame interpolation is restricted on the basis of information for restricting frame interpolation in the present technology. FIG. 14(a) illustrates moving image data (received moving image data) of a frame rate of 24 Hz obtained by decoding operation of the decoder 204. FIG. 14 (b) illustrates moving image data of a frame rate of 120 Hz obtained by performing frame repeat on the decoder-output moving image data of a frame rate of 24 Hz by one or both of the decoder 204 and the display processing unit 205.

In the case of this example, no shift in the display timing from the original 24 Hz time grid occurs and frame interpolation is not performed, making it possible to maintain the original image quality and to avoid hindrance of accurate reflection of the intention at the time of production.

2. MODIFICATION EXAMPLE

Note that in the above-described embodiment, a frame interpolation restriction descriptor having information for restricting frame interpolation is inserted into a layer of the transport stream TS as a container, and a frame interpolation restriction SEI message having information for restricting interpolation is inserted into a layer of the video stream. It is, however, not always necessary to insert both the descriptor and the SEI message, and it is allowable to have a configuration in which solely one of them is inserted.

Moreover, in the above-described embodiment, "frame_interpolation_prohibited_flag" as information indicating prohibition of frame interpolation and "frame_repeat_type" as information indicating the number of times of frame repeats are included in each of the frame interpolation restriction descriptor and the frame interpolation restriction SEI message.

Figures 15, 16:
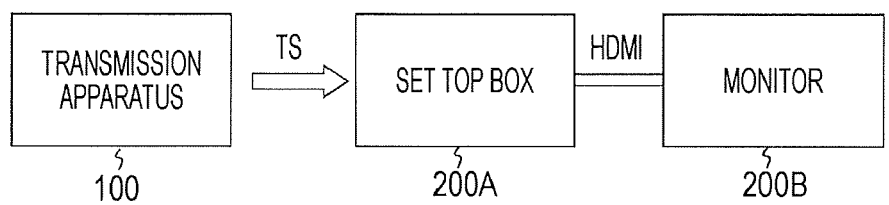
FIG. 15 is a diagram illustrating a display sequence newly defined in "pic_struct" of a picture timing SEI message.
FIG. 16 is a block diagram illustrating another exemplary configuration of the transmission-reception system.

It is also conceivable to allow the information indicating the number of times of frame repeats to be included in the picture timing SEI message (refer to FIG. 10). In this case, for example, a new display sequence is defined in "pic_struct" as illustrated in FIG. 15. For example, "13" indicates three frame repeats for "frame quadrupling". Moreover, "14" indicates four frame repeats for "frame quintupling". Moreover, "15" indicates unlimited frame repeat. This is based on the assumption that the number of times of repeats is not specified, and the reception display side determines the number of times of repeats so as to match the frame rate of the display.

Moreover, while the above-described embodiment illustrates a case where the transmission-reception system 10 includes the transmission apparatus 100 and the reception apparatus 200, the configuration of the transmission-reception system to which the present technology can be applied is not limited to this. For example, as in a transmission-reception system 10A illustrated in FIG. 16, the reception apparatus 200 may be substituted with a set top box (STB) 200A and a monitor 200B connected with each other by a digital interface, for example, a digital interface of high-definition multimedia interface (HDMI). Note that "HDMI" is a registered trademark.

In this case, for example, portions up to the decoder 204 would be included in the set top box 200A, and the display processing unit 205 and succeeding portions would be included in the monitor 200B. In this case, in consideration of the transmission rate in the digital interface of the HDMI, it would be configured, for example, such that frame rate conversion is not performed in the decoder 204 of the set top box 200A. Specifically, the decoder 204 of the set top box 200A outputs the moving image data of the original frame rate as when received, and the set top box 200A outputs the moving image data (uncompressed moving image data) to the monitor 200 via the HDMI digital interface.

Moreover, the set top box 200A transmits information for restricting frame interpolation to the monitor 200 via the HDMI digital interface. For example, the set top box 200A transmits the information for restricting frame interpolation by inserting it in a blanking period of the moving image data. For example, the information for restricting frame interpolation is transmitted to the monitor 200B using a packet "Video displaying InfoFrame".

FIG. 17 (a) illustrates an exemplary structure (Syntax) of a packet of "Video displaying InfoFrame" transmitted from the set top box 200A to the monitor 200B. Moreover, FIG. 17 (b) illustrates content of main information in the exemplary structure.

1-bit information of "frame_interpolation_prohibited_flag" is arranged in the seventh bit of the fourth byte. The 1-bit information indicates flag information indicating whether to prohibit frame interpolation. For example, "1" indicates that frame interpolation is prohibited, and "0" indicates that frame interpolation is not prohibited.

Moreover, 3-bit information of "frame_repeat_type" is arranged at a range from the sixth bit to the fourth bit of the fourth byte. This 3-bit information indicates the type of frame repeat. For example, "000" indicates unlimited frame repeat. This is based on the assumption that the number of times of repeats is not specified, and the reception display side determines the number of times of repeats so as to match the frame rate of the display. Moreover, "001" indicates one frame repeat, "010" indicates two frame repeats, "011" indicates three frame repeats, "100" indicates four frame repeats, and "101" indicates five frame repeats.

The CPU of the monitor 200B controls operation of the display processing unit 205 on the basis of the information for restricting frame interpolation transmitted from the set top box 200A. While details of this control are omitted, the control is performed similarly to the control in the reception apparatus 200 of the transmission-reception system 10 described above.

Note that it is also conceivable to use other "InfoFrame" packets, such as a "Vender Specific InfoFrame" packet, for example, instead of using "Video displaying InfoFrame" packet in transmission of the information for restricting frame interpolation from the set top box 200A to the monitor 200B. Moreover, it is also conceivable to transmit the information for restricting frame interpolation via a CEC line or a HEC communication line.

Moreover, the above-described embodiment is an example in which the container is a transport stream (MPEG-2 TS). The present technology, however, can also be similarly applied to a system configured to perform distribution to reception terminals using a network such as the Internet. In the distribution via the Internet, distribution is often performed in a container of MP4 or other format. That is, containers of various formats such as a transport stream (MPEG-2 TS) or a MPEG media transport (MMT) adopted in the digital broadcasting standard, and MP4 used for distribution via the Internet are applicable as the container.

Moreover, the present technology may also be configured as below.

(1) A transmission apparatus including:

a transmission unit configured to transmit a predetermined container including a video stream obtained by performing encoding operation on moving image data of a predetermined frame rate; and an information insertion unit configured to insert information for restricting frame interpolation into one or both of a layer of the container and a layer of the video stream.

(2) The transmission apparatus according to (1), in which the information for restricting frame interpolation includes information for prohibiting frame interpolation.

(3) The transmission apparatus according to (1) or (2), in which the information for restricting the frame interpolation includes information indicating the number of times of frame repeats.

(4) The transmission apparatus according to any of (1) to (3), in which the information insertion unit inserts a descriptor including the information for restricting frame interpolation into the layer of the container.

(5) The transmission apparatus according to any of (1) to (4), in which the information insertion unit inserts an SEI message including the information for restricting frame interpolation into the layer of the video stream.

(6) A transmission method including:

a transmission step of transmitting a predetermined container including a video stream obtained by performing encoding operation on moving image data of a predetermined frame rate; and an information insertion step of inserting information for restricting frame interpolation into one or both of a layer of the container and a layer of the video stream.

(7) An image processing apparatus including:

an image data acquisition unit configured to obtain moving image data of a predetermined frame rate;

a frame rate conversion processing unit configured to convert the frame rate of the moving image data into a display frame rate and perform output at the display frame rate; and a control unit configured to control operation of the frame rate conversion processing unit on the basis of information for restricting frame interpolation.

(8) The image processing apparatus according to (7), in which the image data acquisition unit receives a container of a predetermined format including a video stream obtained by performing encoding operation on the moving image data of the predetermined frame rate, and obtains the moving image data of the predetermined frame rate by performing decoding operation on the video stream.

(9) The image processing apparatus according to (8), in which the information for restricting frame interpolation is inserted into one or both of a layer of the container and a layer of the video stream.

(10) The image processing apparatus according to (7), in which the image data acquisition unit obtains the moving image data of the predetermined frame from an external device via a digital interface.

(11) The image processing apparatus according to (10), in which the information for restricting frame interpolation is obtained from the external device via the digital interface.

(12) An image processing method including:

an image data acquisition step of obtaining moving image data of a predetermined frame rate;

a frame rate conversion processing step of converting the frame rate of the moving image data into a display frame rate and performs output at the display frame rate; and a control step of controlling operation of the frame rate conversion processing step on the basis of information for restricting frame interpolation.

(13) A reception apparatus including a reception unit configured to receive a container of a predetermined format including a video stream obtained by performing encoding operation on moving image data of a predetermined frame rate, information for restricting frame interpolation being inserted into one or both of a layer of the container and a layer of the video stream, the reception apparatus further including:

a decoding unit configured to obtain moving image data of a predetermined frame rate by performing decoding operation on the video stream;

a frame rate conversion processing unit configured to convert the frame rate of the moving image data obtained by the decoding unit into a display frame rate and performing output at the display frame rate; and a control unit configured to control operation of the frame rate conversion processing unit on the basis of the information for controlling frame interpolation.

(14) A reception method including a reception step of receiving, by a reception unit, a container of a predetermined format including a video stream obtained by performing encoding operation on moving image data of a predetermined frame rate, information for restricting frame interpolation being inserted into one or both of a layer of the container and a layer of the video stream, the reception method further including:

a decoding step of obtaining moving image data of a predetermined frame rate by performing decoding operation on the video stream;

a frame rate conversion processing step of converting the frame rate of the moving image data obtained by the decoding step into a display frame rate and performing output at the display frame rate; and a control step of controlling operation of the frame rate conversion processing step on the basis of the information for controlling frame interpolation.

(15) A reception apparatus including:

an image data reception unit configured to receive moving image data of a predetermined frame rate from an external device via a digital interface;

an information reception unit configured to receive information for restricting frame interpolation from the external device via the digital interface;

a frame rate conversion processing unit configured to convert the frame rate of the moving image data into a display frame rate and perform output at the display frame rate; and a control unit configured to control operation of the frame rate conversion processing unit on the basis of the information for restricting frame interpolation.

(16) A reception method including:

an image data reception step of receiving, by an image data reception unit, moving image data of a predetermined frame rate from an external device via a digital interface;

an information reception step of receiving, by an information reception unit, information for restricting frame interpolation from the external device via the digital interface;

a frame rate conversion processing step of converting the frame rate of the moving image data into a display frame rate and performing output at the display frame rate; and a control step of controlling operation of the frame rate conversion processing step on the basis of the information for restricting frame interpolation.

(17) A reception apparatus including a reception unit configured to receive a container of a predetermined format including a video stream obtained by performing encoding operation on moving image data of a predetermined frame rate, information for restricting frame interpolation being inserted into one or both of a layer of the container and a layer of the video stream, the reception apparatus further including:

a decoding unit configured to obtain moving image data of a predetermine frame rate by performing decoding operation on the video stream; and a transmission unit configured to transmit the moving image data of a predetermined frame rate obtained in the decoding unit and the information for restricting frame interpolation to an external device via a digital interface.

(18) A reception method including a reception step of receiving, by a reception unit, a container of a predetermined format including a video stream obtained by performing encoding operation on moving image data of a predetermined frame rate, information for restricting frame interpolation being inserted into one or both of a layer of the container and a layer of the video stream, the reception method further including:

a decoding step of obtaining moving image data of a predetermine frame rate by performing decoding operation on the video stream; and a transmission step of transmitting the moving image data of a predetermined frame rate obtained in the decoding step and the information for restricting frame interpolation to an external device via a digital interface.

The main feature of the present technology is in that information for restricting frame interpolation is inserted into a layer of a container and a layer of a video stream, thereby restricting, on a reception side, frame interpolation onto moving image data on the basis of the information, making it possible to avoid hindrance of accurate reflection of intention at the time of production (refer to FIG. 8).

REFERENCE SIGNS LIST

10, 10A Transmission-reception system
100 Transmission apparatus
101 CPU
102 Encoder
103 Multiplexer
104 Transmission unit
200 Reception apparatus
200A Set top box
200B Monitor
201 CPU
202 Reception unit
203 Demultiplexer
204 Decoder
205 Display processing unit
206 Display unit

The invention claimed is:

1. A transmission apparatus comprising:
a transmitter configured to transmit a container including a video stream obtained by performing an encoding operation on moving image data having a frame rate; and
processing circuitry configured to
insert, into at least one of the container and the video stream and before the container including the video stream is transmitted, an interpolation prohibition flag indicating whether frame interpolation of the video stream is prohibited from being performed by a receiver that receives the container, and
insert, into the at least one of the container and the video stream, information indicating a number of times a same video frame of the video stream is to be displayed, wherein
the interpolation prohibition flag is a first 1-bit value when the frame interpolation of the video stream is prohibited, and
the interpolation prohibition flag is a second 1-bit value when the frame interpolation of the video stream is not prohibited.

2. The transmission apparatus according to claim 1, wherein the information indicating the number of times the same video frame of the video stream is to be displayed is associated with the interpolation prohibition flag.

3. The transmission apparatus according to claim 2, wherein the information indicating the number of times the same video frame of the video stream is to be displayed is included in a picture timing supplemental enhancement information (SEI) message.

4. The transmission apparatus according to claim 1, wherein the processing circuitry is further configured to insert a descriptor including the interpolation prohibition flag into the container.

5. The transmission apparatus according to claim 1, wherein the processing circuitry is further configured to insert a supplemental enhancement information (SEI) message including the interpolation prohibition flag into the video stream.

6. An image processing apparatus comprising:
processing circuitry configured to
obtain moving image data having a frame rate;
convert the frame rate of the moving image data into a display frame rate; and
output video frames of the moving image data at the display frame rate based on an interpolation prohibition flag indicating whether frame interpolation of the moving image data is prohibited from being performed by a receiver, wherein
the interpolation prohibition flag and information indicating a number of times a same video frame of the video frames is to be displayed is inserted, before the moving image data is obtained, into one of (i) a container including a video stream of the moving image data and (ii) the video stream,
the interpolation prohibition flag is a first 1-bit value when the frame interpolation of the moving image data is prohibited, and
the interpolation prohibition flag is a second 1-bit value when the frame interpolation of the moving image data is not prohibited.

7. The image processing apparatus according to claim 6, wherein the processing circuitry is further configured to receive the container including the video stream obtained by performing an encoding operation on initial moving image data having the frame rate, and obtain the moving image data having the frame rate by performing a decoding operation on the video stream.

8. The image processing apparatus according to claim 6, wherein the processing circuitry is further configured to obtain the moving image data having the frame rate from an external device via a digital interface.

9. The image processing apparatus according to claim 8, wherein the interpolation prohibition flag is obtained from the external device via the digital interface.

10. The image processing apparatus according to claim 6, wherein the processing circuitry is further configured to repeat the same video frame of the video stream to output the moving image data at the display frame rate when the interpolation prohibition flag indicates that the frame interpolation of the video stream is prohibited.

11. A reception apparatus comprising:
a receiver configured to receive a container including a video stream obtained by performing an encoding operation on initial moving image data having a frame rate, an interpolation prohibition flag and information indicating a number of times a same video frame of the video stream is to be displayed being inserted into one of the container and the video stream, the interpolation prohibition flag indicating to the receiver whether frame interpolation of the video stream is prohibited from being performed by the receiver; and
processing circuitry configured to obtain decoded moving image data having a frame rate by performing a decoding operation on the video stream and configured to convert the frame rate of the decoded moving image data into a display frame rate and output the decoded moving image data at the display frame rate based on the received interpolation prohibition flag, the interpolation prohibition flag being inserted before the container including the video stream is received by the receiver into one of the container and the video stream, wherein
the interpolation prohibition flag is a first 1-bit value when the frame interpolation of the video stream is prohibited, and
the interpolation prohibition flag is a second 1-bit value when the frame interpolation of the video stream is not prohibited.

12. A reception apparatus comprising:
a receiver configured to receive moving image data having a frame rate and receive an interpolation prohibition flag indicating whether frame interpolation of the moving image data at the receiver is prohibited and information indicating a number of times a same video frame of the moving image data is to be displayed, the interpolation prohibition flag being received from an external device via a digital interface; and
processing circuitry configured to convert the frame rate of the moving image data into a display frame rate and output video frames of the moving image data at the display frame rate based on the received interpolation prohibition flag, the interpolation prohibition flag being inserted before the moving image data is received into one of (i) a container including a video stream of the moving image data and (ii) the video stream, wherein
the interpolation prohibition flag is a first 1-bit value when the frame interpolation of the moving image data is prohibited, and
the interpolation prohibition flag is a second 1-bit value when the frame interpolation of the moving image data is not prohibited.

13. A reception apparatus comprising:
a receiver configured to
   receive a container including a video stream obtained by performing an encoding operation on initial moving image data having a frame rate, an interpolation prohibition flag and information indicating a number of times a same video frame of the video stream is to be displayed being inserted into at least one of the container and the video stream, the interpolation prohibition flag indicating whether frame interpolation of the video stream is prohibited from being performed by the receiver; and
processing circuitry configured to
   obtain decoded moving image data having the frame rate by performing a decoding operation on the video stream, and
   transmit the decoded moving image data of the frame rate obtained in the decoding operation and the received interpolation prohibition flag, the interpolation prohibition flag being inserted before the container including the video stream is received into the at least one of the container and the video stream, wherein
the interpolation prohibition flag is a first 1-bit value when the frame interpolation of the video stream is prohibited, and
the interpolation prohibition flag is a second 1-bit value when the frame interpolation of the video stream is not prohibited.

\* \* \* \* \*